(12) United States Patent
Smith et al.

(10) Patent No.: US 10,594,660 B2
(45) Date of Patent: Mar. 17, 2020

(54) SELECTING PROXIES (71) Applicant: Hewlett-Packard Development Company, L.P., Houston, TX (US)

(72) Inventors: David Smith, Eagle, ID (US); Mark A. Fahrenkrug, Waukee, IA (US)

(73) Assignee: Hewlett-Packard Development Company, LP., Spring, TX (US)

( * ) Notice: Subject to any disclaimer, the term of this patent is extended or adjusted under 35 U.S.C. 154(b) by 106 days.

(21) Appl. No.: 15/320,211

(22) PCT Filed: Jun. 26, 2014

(86) PCT No.: PCT/US2014/044404
§ 371 (c)(1),
(2) Date: Dec. 19, 2016

(87) PCT Pub. No.: WO2015/199702
PCT Pub. Date: Dec. 30, 2015

(65) Prior Publication Data
US 2017/0155623 A1    Jun. 1, 2017

(51) Int. Cl.
*H04L 29/06*    (2006.01)
*H04L 29/08*    (2006.01)
(Continued)

(52) U.S. Cl.
CPC .......... *H04L 63/0281* (2013.01); *G06F 9/505* (2013.01); *H04L 63/029* (2013.01);
(Continued)

(58) Field of Classification Search
CPC .... G06F 15/16; G06F 9/465; G06F 17/30067; G06F 9/505; G06F 21/552; G06F 9/50;
(Continued)

(56) References Cited

U.S. PATENT DOCUMENTS 6,061,798 A    5/2000  Coley et al.
6,173,311 B1 *  1/2001  Hassett ............ G06F 17/30067
                                                       707/E17.01
(Continued)

FOREIGN PATENT DOCUMENTS

WO    WO-2012162815 A1    12/2012
WO    WO2013106454         7/2013
WO    WO-2013121325        8/2013

OTHER PUBLICATIONS

Dynamic Grouping Strategy in Cloud Computing Qin Liu, Yuhong Guo, Jie Wu and Guojun Wang pp. 8 (Year: 2012).*

(Continued)

*Primary Examiner* — Jeffrey C Pwu
*Assistant Examiner* — Ali H. Cheema
(74) *Attorney, Agent, or Firm* — HP Inc. Patent Department (57) ABSTRACT

Example embodiments relate to selecting proxies. In this manner, the embodiments disclosed herein enable determination of a device to which to send communication through a firewall and determination of a set of proxies available to communicate with the device through the firewall. A set of success labels are determined for the set of proxies, wherein a success label for an individual proxy comprises information related to communicating with the device via the individual proxy. Based on a first success label determined for the first proxy, a first proxy may be selected to communicate with the determined device.

15 Claims, 4 Drawing Sheets

(51) Int. Cl.
*G06F 9/50* (2006.01)
*H04L 12/28* (2006.01)
*G06F 9/46* (2006.01)
*H04L 29/12* (2006.01)
*H04W 4/70* (2018.01)

(52) U.S. Cl.
CPC .......... *H04L 67/1023* (2013.01); *G06F 9/465* (2013.01); *H04L 12/2856* (2013.01); *H04L 29/12047* (2013.01); *H04L 63/20* (2013.01); *H04L 67/1002* (2013.01); *H04L 67/1008* (2013.01); *H04W 4/70* (2018.02)

(58) Field of Classification Search
CPC ... G06F 9/45558; G06Q 30/02; H04L 63/105; H04L 12/56; H04L 67/2838; H04L 41/0809; H04L 63/029; H04L 63/0281; H04L 63/02; H04L 63/20; H04L 67/10; H04L 67/1023; H04L 67/1002; H04L 67/1008; H04L 29/12047; H04L 12/2856; H04W 4/21; H04W 4/70
USPC ............. 726/11, 12, 1, 7; 717/178; 709/203, 709/223, 230, 235, 226, 217, 224, 201, 709/221, 227, 202, 238; 707/770; 370/401, 408
See application file for complete search history.

(56) References Cited

U.S. PATENT DOCUMENTS

| | | | |
|---|---|---|---|
| 6,578,068 B1* | 6/2003 | Bowman-Amuah | G06F 9/465 709/203 |
| 6,718,359 B2* | 4/2004 | Zisapel | G06F 9/505 709/238 |
| 7,203,764 B2* | 4/2007 | Jorgenson | G06F 9/505 709/217 |
| 7,581,009 B1* | 8/2009 | Hsu | H04L 67/1008 709/226 |
| 7,769,834 B2 | 8/2010 | Ly et al. | |
| 7,827,601 B2 | 11/2010 | Schwartz | |
| 7,984,110 B1* | 7/2011 | Raman | G06F 9/505 709/217 |
| 8,015,298 B2* | 9/2011 | Yevmenkin | H04L 67/1002 709/202 |
| 8,751,418 B1 | 6/2014 | Sutter et al. | |
| 9,436,508 B1* | 9/2016 | Theimer | G06F 9/45558 |
| 9,438,564 B1* | 9/2016 | Weng | H04L 63/0281 |
| 2006/0253896 A1* | 11/2006 | Alesso et al. | H04L 12/56 370/401 |
| 2007/0297430 A1* | 12/2007 | Nykanen | H04L 63/029 370/408 |
| 2008/0162702 A1* | 7/2008 | Jia | H04L 12/2856 709/227 |
| 2009/0113055 A1* | 4/2009 | Cicchino | H04L 29/12047 709/226 |
| 2009/0259736 A1* | 10/2009 | Chang | G06F 9/505 709/221 |
| 2010/0030839 A1* | 2/2010 | Ceragioli | H04L 63/20 709/201 |
| 2010/0174826 A1* | 7/2010 | Sharma | H04L 63/105 709/235 |
| 2010/0205297 A1* | 8/2010 | Sarathy | H04L 43/00 709/224 |
| 2011/0276695 A1* | 11/2011 | Maldaner | G06F 9/5083 709/226 |
| 2012/0036507 A1* | 2/2012 | Jonnala | G06Q 30/02 717/178 |
| 2012/0042367 A1* | 2/2012 | Papakostas | H04L 63/0281 726/7 |
| 2012/0254240 A1* | 10/2012 | Mariotti | H04W 4/21 707/770 |
| 2012/0284328 A1 | 11/2012 | Chung et al. | |
| 2013/0227634 A1* | 8/2013 | Pal | G06F 21/552 726/1 |
| 2013/0238719 A1 | 9/2013 | Gourevitch et al. | |
| 2013/0305341 A1* | 11/2013 | Baker | H04L 41/0809 726/11 |
| 2013/0340065 A1* | 12/2013 | Dyer | H04L 63/0281 726/12 |
| 2014/0013001 A1* | 1/2014 | Cox | H04L 67/1002 709/230 |
| 2014/0122580 A1* | 5/2014 | Nuaimi | H04L 63/0281 709/203 |
| 2014/0359131 A1* | 12/2014 | Seed | H04W 4/70 709/226 |
| 2015/0350363 A1* | 12/2015 | Li | H04L 67/2838 709/223 |

OTHER PUBLICATIONS

Weissman, J. et al., Using Proxies to Accelerate Cloud Applications, (Research Paper), May 26, 2009 ~ 5 pages.

* cited by examiner

```
600 RECEIVE INFORMATION RELATED TO COMMUNICATION WITH
DEVICE VIA FIRST PROXY
```
↓
```
610 MOVE FIRST PROXY FROM FIRST SUBSET OF PROXIES TO
SECOND SUBSET OF PROXIES BASED ON RECEIVED INFORMATION
```

FIG. 7

| PROXY IDENTIFIER | PROXY SUCCESS LABEL | SUBSET IDENTIFIER | LAST COMMUNICATION ATTEMPT | SUCCESS OF LAST ATTEMPT |
|---|---|---|---|---|
| FIRST PROXY 300A | MAPPED | A | FIRST DATE/TIME | YES |
| SECOND PROXY 300B | UNTRIED | C | | |
| THIRD PROXY 300C | MAPPED | A | THIRD DATE/TIME | YES |
| FOURTH PROXY 300D | TRIED | B | FOURTH DATE/TIME | NO |
| FIFTH PROXY 300E | TRIED | B | FIFTH DATE/TIME | NO |
| SIXTH PROXY 300F | MAPPED | A | SIXTH DATE/TIME | YES |
| SEVENTH PROXY 300G | MAPPED | A | SEVENTH DATE/TIME | YES |
| NTH PROXY 300N | UNTRIED | C | | |

SELECTING PROXIES

BACKGROUND

The selection of a proxy to communicate through a firewall to a computing device in a system is often determined based on the characteristics and/or availability of the proxies in the system. In some examples, computing devices wishing to communicate through the firewall may need to track and continually update a mapping of proxies in the system. In other examples, computing devices may need to repeatedly ping proxies to determine their availability.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

A system with a plurality of computing devices connected via an intranet may often use a firewall to manage communication between the computing devices and external devices. Such example systems often also use proxy devices to facilitate communication between an external device and a computing device behind the firewall. External devices may often be unaware of which proxy to use to communicate with a computing device behind the firewall. These external devices may select a proxy based on availability, location of the proxy with relation to the computing device in the system, functionality available at the proxy, and/or for other reasons. An external device may not have knowledge of the availability of a proxy, however, unless the proxy supplies that information to the external device or the external device explicitly requests such information from the proxy. As such, communication with a computing device in the system may involve time consuming and complex initial communications between the external device and the proxies in the system.

Example embodiments disclosed herein address this issue by enabling determination of a device to which to send communication through a firewall and determination of a set of proxies available to communicate with the device through the firewall. An external computing device may maintain information related to previous communication attempts by a particular proxy to communicate with a device behind the firewall, and may use that information to determine which proxy to use for future communication with the device. The previous communication attempts may be part of routine functionality of the external device, and may not be explicit attempts to determine proxy availability. In some examples, the communication attempts may comprise a combination of routine functionality and explicit attempts to determine proxy availability. A set of success labels may be determined for the set of proxies, wherein a success label for an individual proxy comprises information related to communicating with the device via the individual proxy. Based on a first success label determined for the first proxy, a first proxy may be selected to communicate with the determined device.

Figure 1:
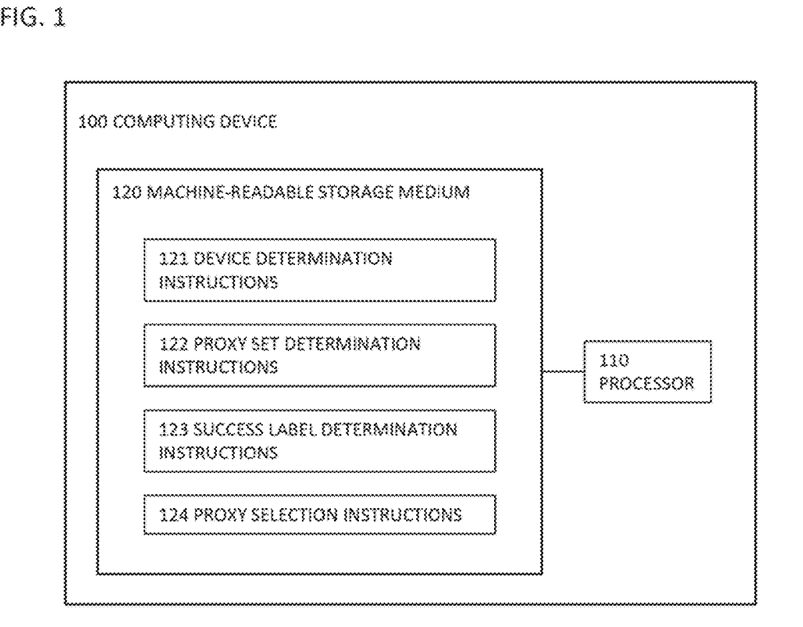
FIG. 1 is a block diagram of an example computing device for selecting proxies.

Referring now to the drawings, FIG. 1 is a block diagram of an example computing device 100 for selecting proxies. Computing device 100 may be a cloud server, a mainframe, notebook, desktop, tablet, workstation, mobile device, or any other device suitable for executing the functionality described below. In the embodiment of FIG. 1, computing device 100 includes a non-transitory machine-readable storage medium 120 and a processor 110.

Processor 110 may be one or more central processing units (CPUs), microprocessors, and/or other hardware devices suitable for retrieval and execution of instructions stored in machine-readable storage medium 120. Processor 110 may fetch, decode, and execute program instructions 121, 122, 123, 124, and/or other instructions to enable proxy selection, as described below. As an alternative or in addition to retrieving and executing instructions, processor 110 may include one or more electronic circuits comprising a number of electronic components for performing the functionality of one or more of instructions 121, 122, 123, 124, and/or other instructions.

In one example, the program instructions 121, 122, 123, 124, and/or other instructions can be part of an installation package that can be executed by processor 110 to implement the functionality described herein. In this case, memory 120 may be a portable medium such as a CD, DVD, or flash drive or a memory maintained by a computing device from which the installation package can be downloaded and installed. In another example, the program instructions may be part of an application or applications already installed on computing device 100.

Machine-readable storage medium 120 may be any hardware storage device for maintaining data accessible to computing device 100. For example, machine-readable storage medium 120 may include one or more hard disk drives, solid state drives, tape drives, and/or any other storage devices. The storage devices may be located in computing device 100 and/or in another device in communication with computing device 100. For example, machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for selecting proxies. As detailed below, storage medium 120 may maintain and/or store the data and information described herein.

Device determination instructions 121, when executed by processor 110, may determine a device to which to send communication through a firewall. The device determination instructions 121, when executed by processor 110, may determine a device based on functionality to be executed by the computing device 100, based on a request by the computing device 100 to communicate with a device, and/or based on other ways to determine a device to which to send communication.

Proxy set determination instructions 122, when executed by processor 110, may determine a set of proxies available to communicate with the device through the firewall. For example and as mentioned above, in a system in which a firewall exists between the devices in the system and external computing devices such as computing device 100, the computing device may need to access the device through a proxy.

The proxy set determination instructions 122, when executed by processor 110, may determine the set of proxies available to communicate with a device in various manners, and is not limited to the examples described herein. For example, the proxy set determination instructions 122, when executed by processor 110, may determine the availability of a proxy to communicate with a device while performing other functionality of the system and/or the computing device 100. In this example, the proxy set determination instructions 122, when executed by processor 110, may passively determine proxy availability. In some examples, the proxy set determination instructions 122, when executed by processor 110, may both actively and passively determine proxy availability. In another example, the proxy set determination instructions 122, when executed by processor 110, may determine the proxies available to communicate with each device through the firewall by engaging in syn/acks with each device in the system via each proxy and determining proxy availability based on the responses received. In some examples, the proxy set determination instructions 122, when executed by processor 110, may maintain a map of each device and proxy pairing in the system. In another example, the proxy set determination instructions 122, when executed by processor 110, may continually update the availability of a proxy for a device in the system based on communications via the system.

The success label determination instructions 123, when executed by processor 110, may determine a set of success labels for the set of proxies determined for each device in the system. A success label for an individual proxy may comprise information related to the proxy's communication with a device. For example, the success label may comprise information indicating that a predetermined number of previous attempts to communicate with the device were successful, were unsuccessful, were attempted but blocked due to external reasons, and/or were otherwise handled. The success label may also comprise information indicating that communication to the device via the proxy has not been attempted. The information included in a success label is not limited to the examples described herein.

In some examples, the success labels available for the set of proxies may comprise a set of predetermined success labels. In some examples, the success label determination instructions 123, when executed by processor 110, may revise the available success labels. For example, responsive to a success label not having been used for a predetermined amount of time, the success label determination instructions 123, when executed by processor 110, may remove the success label from the set of available success labels.

In another example, the success label determination instructions 123, when executed by processor 110, may add a new success label to the set of success labels. To that end, the success label determination instructions 123, when executed by processor 110, may add a new success label responsive to determining that a new type of communication pattern is occurring between a proxy and a device. For example, the success label determination instructions 123, when executed by processor 110, may add the new success label responsive to the new pattern occurring a predetermined number of times.

In some examples, the success label determination instructions 123, when executed by processor 110, may add a new success label responsive to receiving information related to the new success label. The success label determination instructions 123, when executed by processor 110, may receive the information related to the new success label from a user of the computing device, from the system, from a proxy and/or computing device in the system, and/or from another source.

Responsive to adding a new success label, the success label determination instructions 123, when executed by processor 110, may determine a subset of the set of proxies that may be associated with the new success label. In some examples, the success label determination instructions 123, when executed by processor 110, may determine whether to re-associate each proxy in the set of proxies responsive to changing the set of available success labels.

In some examples, the success label determination instructions 123, when executed by processor 110, may revise a success label associated with a proxy. The success label determination instructions 123, when executed by processor 110, may revise a success label associated with a proxy based on a predetermined number of communication attempts to communicate with a device using the proxy. For example, based on receiving information related to the proxy that indicates that its communication attempts to a device did not match the success label associated with the proxy, the success label determination instructions 123, when executed by processor 110, may revise the success label for the proxy to indicate the type of communication between the proxy and the device.

In some examples, the proxy selection instructions 124, when executed by processor 110, may receive information from a proxy indicating a communication status and may revise the success label associated with the proxy based on that information. For example, the information related to the communication status may comprise information indicating that the proxy is unavailable for use, will be unavailable for use for a predetermined time period, is available for use, and/or other type of communication status.

In some examples, the success label determination instructions 123, when executed by processor 110, may initially assign each proxy in the set of proxies a success label that indicates no attempt at communication has been made between the proxy and the device. The success label determination instructions 123, when executed by processor 110, may revise the success label for a proxy based on a predetermined amount of communication attempts with a same outcome between the proxy and the device.

The success label determination instructions 123, when executed by processor 110, may group the set of proxies into subsets of proxies based on the success labels associated with each proxy. For example, the success label determination instructions 123, when executed by processor 110, may group together each proxy with a first success label (e.g., indicating successful communication attempts with the device) into a first subset of proxies and may group together each proxy with a second success label (e.g., indicating unsuccessful communication attempts with the device) into a second subset of proxies. The success label determination instructions 123, when executed by processor 110, may move a proxy from one subset to another based on revising the success label associated with the proxy.

In some examples, the proxy selection instructions 124, when executed by processor 110, may select a proxy to communicate with the determined device. The proxy selection instructions 124, when executed by processor 110, may select the proxy based on the success labels associated with the proxy. For example, the proxy selection instructions 124, when executed by processor 110, may select a proxy at random.

In another example, the proxy selection instructions 124, when executed by processor 110, may select a proxy by selecting a subset of proxies and choosing a proxy from the selected subset of proxies. The proxy selection instructions 124, when executed by processor 110, may group the set of proxies into proxy subsets in a manner the same as or similar to the success label determination instructions 123 (instead of having the success label determination instructions 123 be executed to do so). Regardless of how the proxies are grouped into subsets, the proxy selection instructions 124, when executed by processor 110, may select a first proxy to communicate with the device by selecting a proxy subset to communicate with the device.

The proxy selection instructions 124, when executed by processor 110, may select a proxy subset based on the success labels associated with each proxy subset. In some examples, the proxy selection instructions 124, when executed by processor 110, may select a proxy subset associated with a success label indicating successful communication with the device. In another example, the proxy selection instructions 124, when executed by processor 110, may select first select a proxy subset associated with a success label indicating no communication attempt between the proxy and the device has occurred. Responsive to an unsuccessful communication attempt from a proxy in that proxy subset, the proxy selection instructions 124, when executed by processor 110, may then select the proxy subset associated with the success label indicating successful communication. In another example, the proxy selection instructions 124, when executed by processor 110, may select each proxy subset in turn (e.g., in a round robin manner).

In some examples, the proxy selection instructions 124, when executed by processor 110, may associate weights with each proxy subset and may select a proxy subset based on the associated weights. For example, each weight may represent a percentage based on which a proxy subset should be selected by the proxy selection instructions 124, when executed by processor 110. The proxy selection instructions 124, when executed by processor 110, may revise the weights associated with each proxy subset. For example, the proxy selection instructions 124, when executed by processor 110, may revise the weights associated with each proxy based upon the success of the attempts to use proxies from each subset of proxies. For example, responsive to a predetermined number of consecutive unsuccessful attempts to communicate with the device using a proxy from a particular proxy subset, the proxy selection instructions 124, when executed by processor 110, may reduce the weight associated with that subset and re-allocate the weights associated with the other proxy subsets.

Responsive to selecting a proxy subset, the proxy selection instructions 124, when executed by processor 110, may select a proxy from that proxy subset to use to communicate with the device. The proxy selection instructions 124, when executed by processor 110, may select the proxy from the proxy subset based on a set of conditions associated with each proxy in the proxy subset. In some examples, each proxy may be associated with a respective set of conditions, where the set of conditions relate to the uses and/or functionality available via the proxy. For example, a condition in the set of conditions may comprise encryption functionality. Accordingly, responsive to communication between the computing device and the proxy needing to be secured, the proxy selection instructions 124, when executed by processor 110, may select a proxy from the proxy subset with encryption functionality. Other conditions may comprise, for example, data throughput measurements, number of available connections, and/or other characteristics or functionality available at a proxy. In some examples, the proxy selection instructions 124, when executed by processor 110, may receive information from a proxy regarding the characteristics and/or functionality available at the proxy.

In other examples, responsive to selecting a proxy subset, the proxy selection instructions 124, when executed by processor 110, may select a proxy from the proxy subset at random. In other examples, the proxy selection instructions 124, when executed by processor 110, may select each proxy in turn (e.g., in a round robin manner). The proxy selection instructions 124, when executed by processor 110, may select a proxy in other manners as well and is not limited to the examples described herein.

Figure 2:
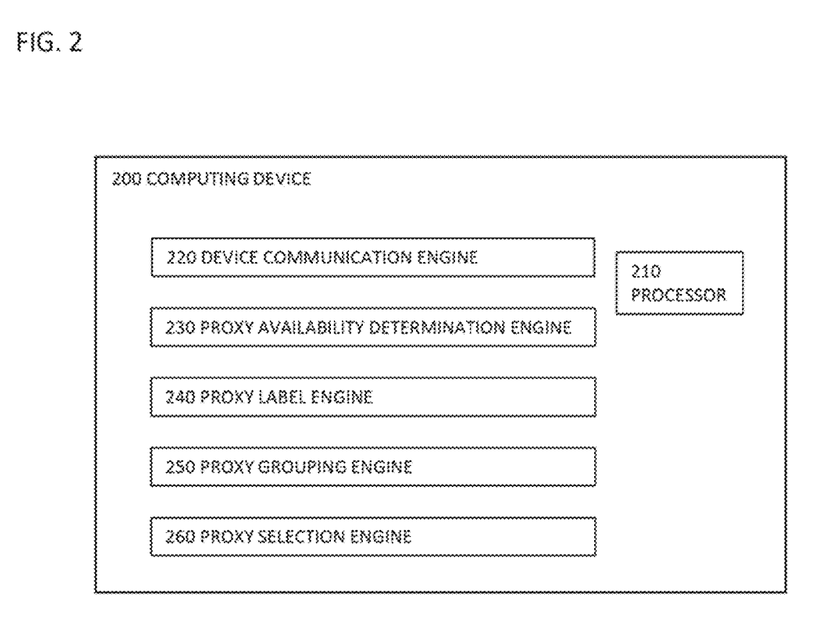
FIG. 2 is a block diagram of an example computing device for selecting proxies.

FIG. 2 is a block diagram of an example computing device 200 for selecting proxies. As with computing device 100, computing device 200 may be a cloud server, a mainframe, notebook, desktop, tablet, workstation, mobile device, or any other device suitable for executing the functionality described below. As with processor 110 of FIG. 1, processor 220 may be one or more CPUs, microprocessors, and/or other hardware devices suitable for retrieval and execution of instructions.

As detailed below, computing device 200 may include a series of engines 220-260 for selecting proxies. Each of the engines may generally represent any combination of hardware and programming. For example, the programming for the engines may be processor executable instructions stored on a non-transitory machine-readable storage medium and the hardware for the engines may include at least one processor of the computing device 200 to execute those instructions. In addition or as an alternative, each engine may include one or more hardware devices including electronic circuitry for implementing the functionality described below.

Device communication engine 220 may determine a device to which to send communication, where the device may be located behind a firewall and accessible by proxy. In some examples, the device communication engine 220 may determine the device in a manner the same as or similar to that of the device determination instructions 122 of computing device 100. Further details regarding an example implementation of device communication engine 220 are provided above in connection with device determination instructions 122 of FIG. 1.

Proxy availability determination engine 230 may determine a set of proxies available to communicate with the device through the firewall. In some examples, the proxy availability determination engine 230 may determine the available set of proxies in a manner the same as or similar to that of the computing device 100. Further details regarding an example implementation of proxy availability determination engine 230 are provided above in connection with proxy set determination instructions 123 of FIG. 1.

Proxy label engine 240 may determine a set of success labels for the set of proxies, wherein a success label for an individual proxy comprises information related to communicating with the device via the individual proxy. The proxy label engine 240 may also receive information related to a new success label to be added to the set of success labels and determine a subset of the set of proxies to be associated with the new success label. In some examples, the proxy label engine 240 may determine the set of success labels in a manner the same as or similar to that of the computing device 100. Further details regarding an example implementation of proxy label engine 240 are provided above in connection with success label determination instructions 123 of FIG. 1.

Proxy grouping engine 250 may group the set of proxies into a plurality of proxy subsets based on the success labels determined for the set of proxies, such that a first subset of proxies comprise a plurality of proxies each having the first success label and such that each subset of proxies is associated with a respective success label. In some examples, the proxy grouping engine 250 may group the set of proxies in a manner the same as or similar to that of the computing device 200. Further details regarding an example implementation of proxy grouping engine 250 are provided above in connection with success label determination instructions 123 and/or proxy selection instructions 124 of FIG. 1.

Proxy selection engine 260 may select a first subset of proxies to communicate with the device based on the success label associated with the first subset of proxies, and select a first proxy from the selected first subset of proxies, associate each subset of proxies with a respective weight, and select the first subset of proxies based on a first weight associated with the first subset of proxies. In some examples, the proxy selection engine 260 may select the first subset of proxies in a manner the same as or similar to that of the computing device 200. Further details regarding an example implementation of proxy selection engine 260 are provided above in connection with proxy selection instructions 124 of FIG. 1.

Figure 3:
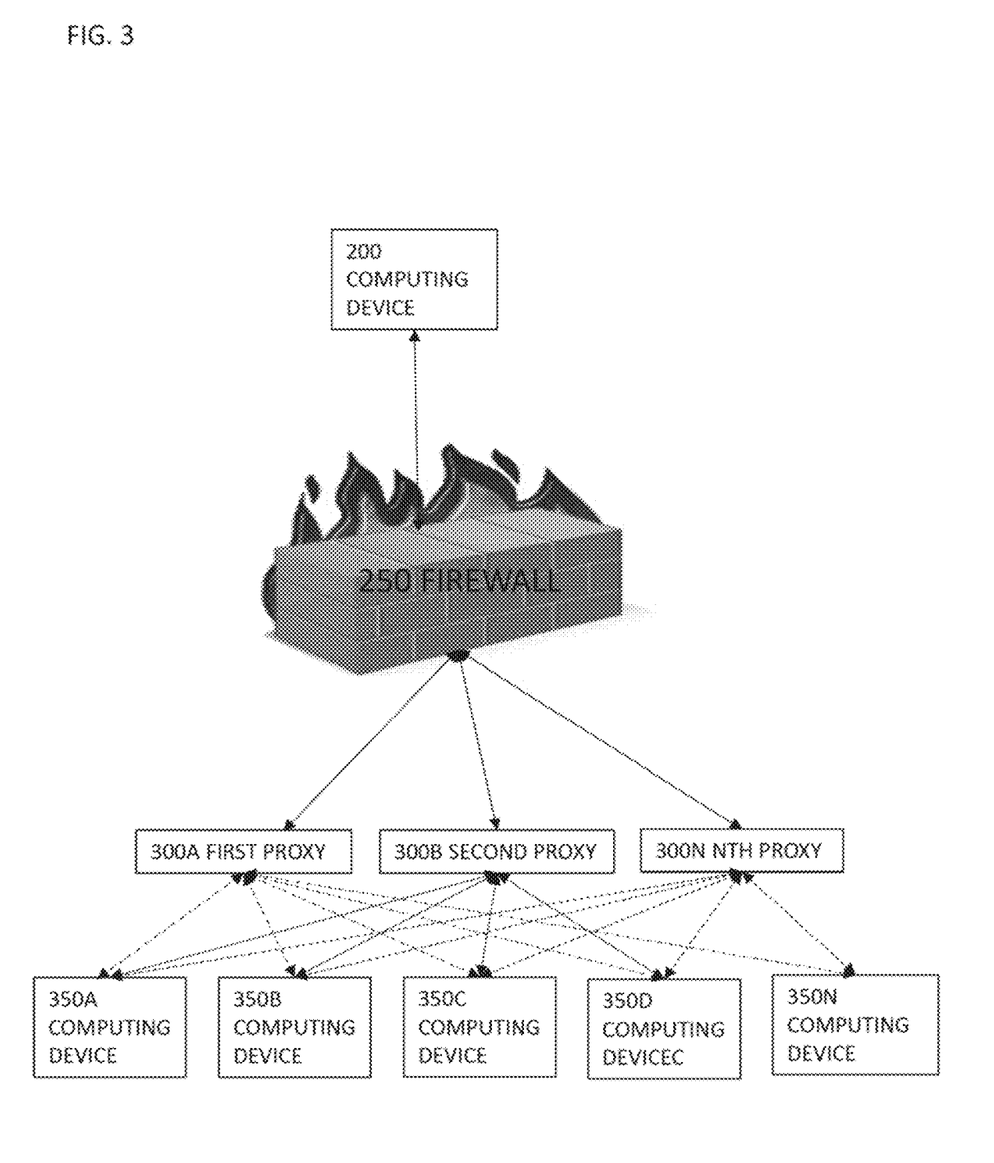
FIG. 3 is a block diagram of an example computing device for selecting proxies in communication with a plurality of proxies and computing devices through a firewall.

FIG. 3 is a block diagram of an example computing device for selecting proxies, where the computing device is in communication with a plurality of proxies and computing devices through a firewall. As illustrated in FIG. 3 and described below, computing device 200 may communicate with computing devices 350A, 350B, 350C, 350D, . . . , 350N via proxies 300A, 300B, . . . , 300B through a firewall 250.

As shown in FIG. 3, each proxy device may communicate with some or all of the computing devices 350A, 350B, . . . , 350N. For example, proxy 300A may be used to communicate with computing devices 350A, 350B, 350C, 350D and 350N, proxy 300B may be used to communicate with computing devices 350A, 350B, 350C, and 350D, and proxy 300N may be used to communicate with computing devices 350A, 350B, 350C, 350D and 350N. The number of proxies and computing devices behind firewall and the communication abilities between the proxies and the computing devices are not limited to the examples described herein.

Figure 4:
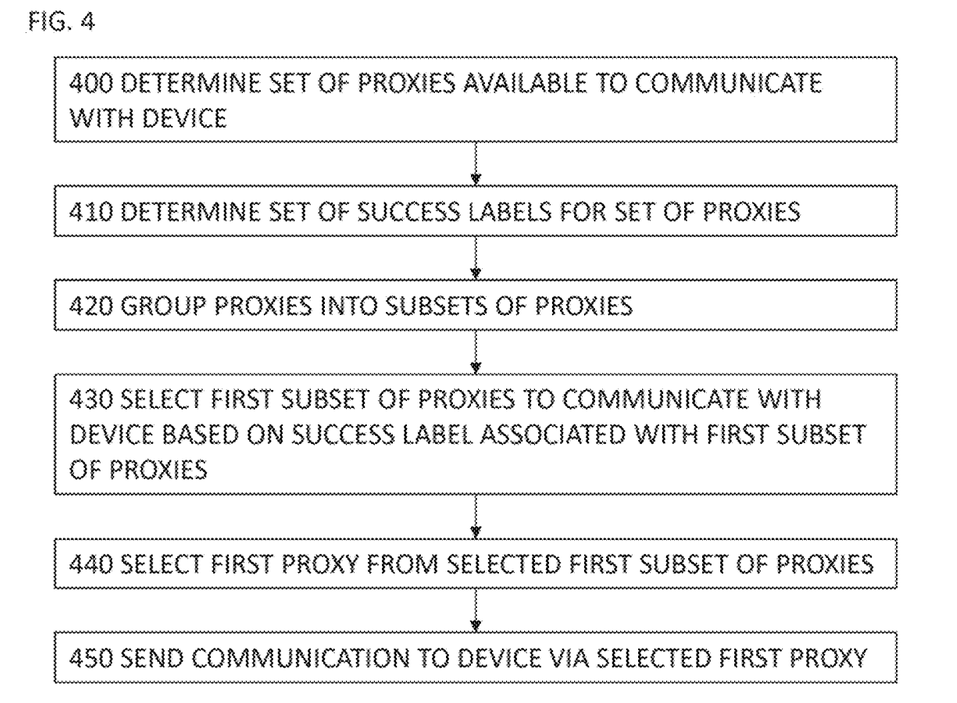
FIG. 4 is a flowchart of an example method for execution by a computing device for selecting proxies.

FIG. 4 is a flowchart of an example method for execution by a computing device for selecting proxies.

Although execution of the methods described below are with reference to computing device 100 of FIG. 1 and/or computing device 200 of FIGS. 2 and 3, other suitable devices for execution of this method will be apparent to those of skill in the art. The method described in FIG. 4 and other figures may be implemented in the form of executable instructions stored on a machine-readable storage medium, such as storage medium 120, by one or more engines described herein, and/or in the form of electronic circuitry.

In an operation 400, a set of proxies available to communicate with a device behind a firewall in the system is determined. For example, the computing device 100 (and/or the device determination instructions 121, the device communication engine 220, or other resource of the computing device 100) may determine the set of available proxies. The computing device 100 may determine the set of available proxies a manner similar or the same as that described above in relation to the execution of the device determination instructions 121, the device communication engine 220, and/or other resource of the computing device 100.

In an operation 410, a set of success labels may be determined for the set of proxies. For example, the computing device 100 (and/or the success label determination instructions 123, proxy label engine 240, or other resource of the computing device 100) may determine the set of success labels. The computing device 100 may determine the set of success labels in a manner similar or the same as that described above in relation to the execution of the success label determination instructions 123, proxy label engine 240, or other resource of the computing device 100.

In an operation 420, the set of proxies may be grouped into subsets of proxies. For example, the computing device 100 (and/or the success label determination instructions 123, the proxy label engine 240, the proxy selection instructions 124, the proxy selection engine 250, or other resource of the computing device 100) may group the proxies into subsets of proxies. The computing device 100 may group the proxies in a manner similar or the same as that described above in relation to the execution of the success label determination instructions 123, the proxy label engine 240, the proxy selection instructions 124, the proxy selection engine 250, or other resource of the computing device 100.

In an operation 430, a first subset of proxies may be selected to communicate with the device based on the success label associated with the first subset of proxies. For example, the computing device 100 (and/or the proxy selection instructions 124, the proxy selection engine 250, or other resource of the computing device 100) may select the first subset of proxies. The computing device 100 may select the first subset of proxies in a manner similar or the same as that described above in relation to the execution of the proxy selection instructions 124, the proxy selection engine 250, and/or other resource of the computing device 100.

Figure 4A:
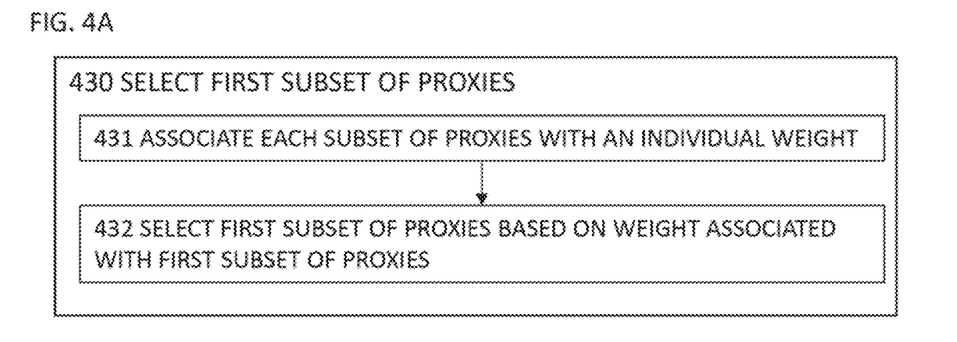
FIG. 4A is a flowchart of an example method for execution by a computing device for selecting a first subset of proxies.

In some examples, the first subset of proxies may be selected in various manners. FIG. 4A is a flowchart of an example method for execution by a computing device for selecting a first subset of proxies.

In an operation 431, each subset of proxies may be associated with an individual weight. For example, the computing device 100 (and/or the proxy selection instructions 124, the proxy selection engine 250, or other resource of the computing device 100) may associate each subset of proxies with an individual weight. The computing device 100 may associate each subset of proxies with an individual weight in a manner similar or the same as that described above in relation to the execution of the proxy selection instructions 124, the proxy selection engine 250, and/or other resource of the computing device 100.

In an operation 432, the first subset of proxies may be selected to communicate with the device based on the weight associated with the first subset of proxies. For example, the computing device 100 (and/or the proxy selection instructions 124, the proxy selection engine 250, or other resource of the computing device 100) may select the first subset of proxies based on the weight associated with the first subset of proxies. The computing device 100 may select the first subset of proxies based on the weight associated with the first subset of proxies in a manner similar or the same as that described above in relation to the execution of the proxy selection instructions 124, the proxy selection engine 250, and/or other resource of the computing device 100.

Returning to FIG. 4, in an operation 440, a first proxy may be selected from the first subset of proxies. For example, the computing device 100 (and/or the proxy selection instructions 124, the proxy selection engine 250, or other resource of the computing device 100) may select a first proxy. The computing device 100 may select a first proxy in a manner similar or the same as that described above in relation to the execution of the proxy selection instructions 124, the proxy selection engine 250, and/or other resource of the computing device 100.

In an operation 450, communication may be sent to the device via the selected proxy. For example, the computing device 100 may communicate with the device via the selected proxy. The computing device 100 may communicate with the device via the selected proxy in a manner similar or the same as that described above in relation to the computing device 100.

Figure 5:
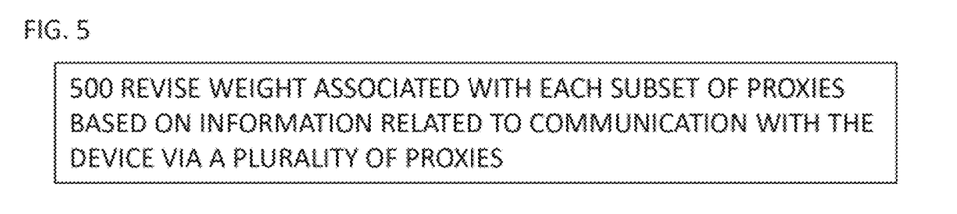
FIG. 5 is a flowchart of an example method for execution by a computing device for selecting proxies.

FIG. 5 is a flowchart of an example method for execution by a computing device for selecting proxies.

In an operation 500, the weights associated with each subset of proxies may be revised based on information related to communication with the device via a plurality of proxies. For example, the computing device 100 (and/or the proxy selection instructions 124, the proxy selection engine 250, or other resource of the computing device 100) may revise the weights. The computing device 100 may revise the weights in a manner similar or the same as that described above in relation to the execution of the proxy selection instructions 124, the proxy selection engine 250, and/or other resource of the computing device 100.

Figure 6:
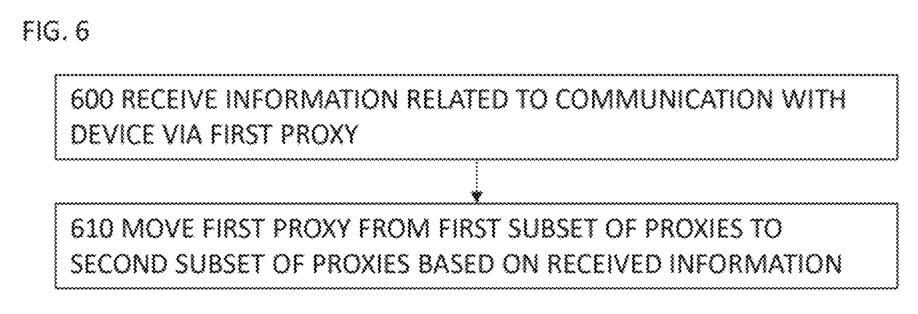
FIG. 6 is a flowchart of an example method for execution by a computing device for selecting proxies.

FIG. 6 is a flowchart of an example method for execution by a computing device for selecting proxies.

In an operation 600, information related to communication with the device via the first proxy may be received. For example, the computing device 100 (and/or the proxy set determination instructions 122, the proxy availability determination engine 230, or other resource of the computing device 100) may receive information related to communication with the device via the first proxy. The computing device 100 may receive the communication in a manner similar or the same as that described above in relation to the execution of the proxy set determination instructions 122, the proxy availability determination engine 230, and/or other resource of the computing device 100.

In an operation 610, the first proxy may be moved from the first subset of proxies to a second subset of proxies based on the received information. For example, the computing device 100 (and/or the success label determination instructions 123, proxy label engine 240, or other resource of the computing device 100) may move the first proxy. The computing device 100 may move the first proxy in a manner similar or the same as that described above in relation to the execution of the success label determination instructions 123, proxy label engine 240, or other resource of the computing device 100.

Figure 7:
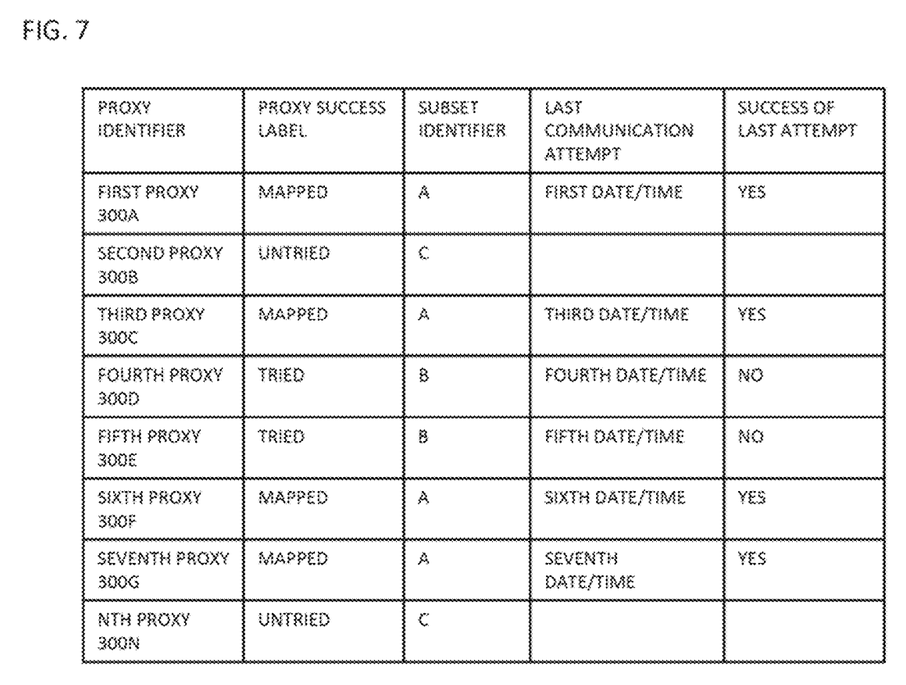
FIG. 7 is an example table comprising information related to selecting proxies.

FIG. 7 depicts an example table 700 comprising information related to selecting proxies. For example, the information related to selecting proxies may comprise information related to each relationship between a proxy and a device in the system. The information related to each proxy may include, for example, a proxy identifier, a proxy success label, a subset identifier, information related to the last communication attempt between the proxy and the device, information related to the success of the last communication attempt, and/or other information related to the relationship between the proxy and the device. In some examples, proxy success labels may comprise the labels of "mapped,", "untried," "tried," and/or other labels that describe the previous communication between the proxy and the device. The information related to the last communication attempt may comprise, for example, a time and date of the last attempt. The information related to the success of the last communication attempt may comprise, for example, binary information related to whether the last communication attempt was successful, labels that indicate whether the last communication attempt was successful, and/or other information related to whether the last communication attempt was successful. Other information related to selecting proxies may also be included, and the information included in the table is not limited to the examples described herein.

In some examples, the table 700 may be used to determine a proxy and/or proxy subset to use to communicate with a device. For example, the computing device 100 may receive a request to communicate with a device behind a firewall in the system. The computing device 100 may use the table 700 to determine a proxy to use to communicate with the first proxy.

The foregoing disclosure describes a number of example embodiments for selecting proxies to use in communication with devices behind a firewall. The disclosed examples may include systems, devices, computer-readable storage media, and methods for selecting proxies. For purposes of explanation, certain examples are described with reference to the components illustrated in FIGS. 1-7. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-7 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

We claim:

1. A non-transitory machine-readable storage medium comprising instructions for selecting proxies, the instructions executable by a processor of a computing device to:
   determine a device in a system to which to send communication through a firewall of the system;
   determine proxies available in the system to communicate with the device through the firewall, wherein proxy availability for communication with the device is determined both passively and actively, wherein the instructions are to cause the processor to:
  passively determine proxy availability for communication with the device while performing other functionality of the computing device without engaging in communication with the device through the firewall of the system; and
  actively determine proxy availability for communication with the device by engaging in communication with the device through the firewall of the system;
determine a label for each of the proxies, wherein the label of each proxy indicates whether the proxy has had successful communication with the device, unsuccessful communication with the device, or has not attempted communication with the device, wherein the instructions are to cause the processor to:
  determine a first label to comprise information indicating that a predetermined number of previous attempts to communicate with the device were successful;
  determine a second label to comprise information indicating that a predetermined number of previous attempts to communicate with the device were unsuccessful; and
  determine a third label to comprise information indicating that communication to the device via the proxy has not been attempted;
group the proxies into a plurality of subsets of proxies based on the labels of the proxies, including a first subset of proxies having the first label indicating successful communication with the device, a second subset of proxies having the second label indicating unsuccessful communication with the device, and a third subset of proxies having the third label indicating that no attempts at communications have been made with the device; and select a first proxy from the first subset of proxies to communicate with the device.

2. The non-transitory machine-readable storage medium of claim 1, further comprising instructions executable by the processor of the computing device to:
  associate a respective weight with each of the plurality of subsets of proxies;
  select the first subset of proxies based on a first weight associated with the first subset of proxies; and
  select the first proxy from the first subset of proxies based on the first weight associated with the first subset of proxies.

3. The non-transitory machine-readable storage medium of claim 1, wherein the instructions executable by the processor of the computing device to select the first proxy comprise instructions to:
  based on a set of conditions associated with each proxy in the first subset of proxies, select the first proxy from the first subset of proxies, wherein the set of conditions comprise a first condition related to use of each proxy.

4. The non-transitory machine-readable storage medium of claim 1, wherein the instructions executable by the processor of the computing device to select the first proxy comprise instructions to:
  select the first proxy from the first subset of proxies based on load balancing.

5. The non-transitory machine-readable storage medium of claim 1, further comprising instructions executable by the processor of the computing device to:
  based on determined information related to communicating with the device via the first proxy, move the first proxy from the first subset of proxies having the first label to the second subset of proxies having the second label.

6. The non-transitory machine-readable storage medium of claim 5, wherein the first proxy is moved to the second subset of proxies based on a predetermined number of unsuccessful attempts to communicate with the device via the first proxy.

7. The non-transitory machine-readable storage medium of claim 1, wherein a second proxy is moved from the third subset of proxies to the second subset of proxies based on a successful attempt to communicate with the device via the second proxy.

8. A computing device for selecting proxies, the computing device comprising:
  a processor; and
  a memory storing instructions that when executed cause the processor to:
  determine a device in a system to which to send communication through a firewall of the system;
  determine proxies available in the system to communicate with the device through the firewall, wherein proxy availability for communication with the device is determined both passively and actively, wherein the instructions are to cause the processor to:
    passively determine proxy availability for communication with the device while performing other functionality of the computing device without engaging in communication with the device through the firewall of the system; and
    actively determine proxy availability for communication with the device by engaging in communication with the device through the firewall of the system;
  determine a label for each of the proxies that indicates whether the proxy has had successful communication with the device, unsuccessful communication with the device, or has not attempted communication with the device, wherein the instructions cause the processor to:
    determine a first label to comprise information indicating that a predetermined number of previous attempts to communicate with the device were successful;
    determine a second label to comprise information indicating that a predetermined number of previous attempts to communicate with the device were unsuccessful; and
    determine a third label to comprise information indicating that communication to the device via the proxy has not been attempted;
  group the proxies into a plurality of proxy subsets based on the labels determined for the proxies, including a first subset of proxies having the first label indicating successful communication with the device, a second subset of proxies having the second label indicating unsuccessful communication with the device, and a third subset of proxies having the third label indicating that no attempts at communications have been made with the device; and
  select a first proxy from the first subset of proxies to communicate with the device.

9. The computing device of claim 8, wherein the instructions when executed cause the processor to:
  associate each subset of proxies with a respective weight; and
  select the first proxy from the first subset of proxies based on a first weight associated with the first subset of proxies.

10. The computing device of claim 8, wherein the instructions when executed cause the processor to:
receive information related a new label that indicates a new type of communication pattern between a proxy and the device; and
determine a fourth subset of proxies to be associated with the new label.

11. The computing device of claim 8, wherein the instructions when executed cause the processor to:
based on determined information related to communicating with the device via the first proxy, move the first proxy from the first subset of proxies with the first label to the second subset of proxies with the second label.

12. The computing device of claim 11, wherein the first proxy is moved to the second subset of proxies based on a predetermined number of unsuccessful attempts to communicate with the device via the first proxy.

13. A method for execution by a computing device for selecting proxies, the method comprising:
determining proxies available in a system to communicate with a device in the system through a firewall, wherein proxy availability for communication with the device is determined both passively and actively, wherein:
the proxy availability is determined passively for communication with the device while performing other functionality of the computing device without engaging in communication with the device through the firewall of the system; and
the proxy availability is determined actively for communication with the device by engaging in communication with the device through the firewall of the system;
determining a label for each of the proxies, wherein the label of each proxy indicates whether the proxy has had successful communication with the device, unsuccessful communication with the device, or has not attempted communication with the device, further comprising:
determining a first label to comprise information indicating that a predetermined number of previous attempts to communicate with the device were successful;
determining a second label to comprise information indicating that a predetermined number of previous attempts to communicate with the device were unsuccessful; and
determining a third label to comprise information indicating that communication to the device via the proxy has not been attempted;
grouping the proxies into a plurality of proxy subsets based on the labels determined for the proxies, including a first subset of proxies having the first label indicating successful communication with the device, a second subset of proxies having the second label indicating unsuccessful communication with the device, and a third subset of proxies having the third label indicating that no attempts at communications have been made with the device;
selecting a first proxy from the first subset of proxies to communicate with the device; and
responsive to selecting the first proxy, sending communication to the device via the selected first proxy through the firewall.

14. The method of claim 13, further comprising: associating each subset of proxies with a respective weight;
selecting the first proxy from the first subset of proxies based on a first weight associated with the first subset of proxies; and
based on information related to communication with the device via the first proxy, revising the first weight associated with the first subset of proxies.

15. The method of claim 13, further comprising:
revising the plurality of proxy subsets to include an additional proxy subset based on a new pattern determined from a predetermined number of attempts to communicate with the device via the first proxy.

* * * * *